July 29, 1969    I. ADLER ET AL    3,457,789
ARCUATE PATH DIVERTER WITH DUST CLOSURE THEREON
Filed Dec. 29, 1966    2 Sheets-Sheet 1

INVENTORS
IMRE ADLER
FRANCIS X CONNELLY
DOUGLAS H. MARTINI

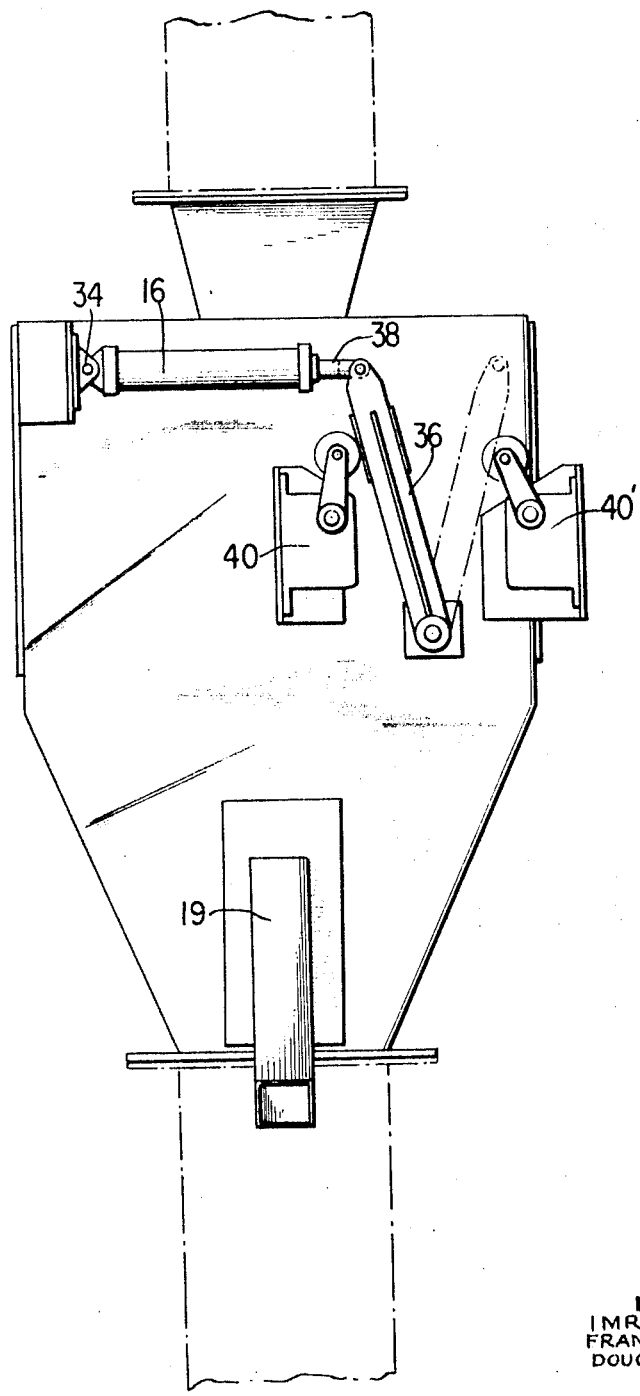

United States Patent Office
3,457,789
Patented July 29, 1969

3,457,789
ARCUATE PATH DIVERTER WITH DUST CLOSURE THEREON
Imre Adler, Verona, Francis X. Connelly, Rutherford, and Douglas H. Martini, Chetham, N.J., assignors to Hewitt-Robins Incorporated, Stamford, Conn., a corporation of Delaware
Filed Dec. 29, 1966, Ser. No. 605,824
Int. Cl. G01n 1/10
U.S. Cl. 73—423     4 Claims

ABSTRACT OF THE DISCLOSURE

A sampler having a sample chute positioned within the path of a downwardly moving stream of material so that the material directed into the chute may be conveyed to a discharge location away from the main stream of material. An open ended hopper is mounted via a linkage system so as to enable the hopper to be swung back and forth over the chute in an arcuate path between non-sampling positions. As the hopper passes from one non-sampling position to another, the hopper directs the entire stream of material into the sample chute. The use of the linkage system enables seal covers which are mounted on the hopper to be brought down into a tight sealing relationship when the hopper is in either of its two non-sampling positions.

---

This invention relates to sampling apparatus and more particularly to an apparatus for sampling a small fraction of a downwardly moving stream of particulate material.

Factories and power stations using large quantities of coal or different types of ore frequently require apparatus for collecting samples of the material in order to ascertain the nature and purity of such material. The accuracy of such determinations are directly dependent upon acquiring an accurate representative sample. Samplers which sample a downwardly moving stream of material must insure that dust and air suspended particles generated by the moving stream of material will not contaminate any of the samples acquired. The use of rubber or plastic sealing covers to cover the sample chute has, heretofore, proved impractical because of the very rapid wear of such covers when they are slid into and out of sealing engagement with the sampler. Thus, a sampler is still required which will effectively seal the sampling chute when a sample is not being taken and which sampler sealing means will have a long service life. Also it is necessary that such samplers be designed so as to facilitate easy access to the mechanical components for repair purposes.

The sampling apparatus of the present invention provides a mechanism which moves the sealing covers through an arcuate path into a sealing position on top of a cutter head of the sampling means in order to thereby greatly reduce the amount of wear and friction experienced by the covers.

Accordingly, one object of the present invention is to provide a sampling device which samples a small fraction of a downwardly moving stream of particulate material and which seals off the sampling chute when a sample is not being taken.

Another object is to provide a sampling apparatus with a sealing means for preventing any material from accidently entering the sample chute when the sampling apparatus is not in use.

Still another object of the present invention is to provide a sampling apparatus with a cover type sealing means which is moved in an arcuate path when engaging or disengaging the cutter sampler so as to reduce the amount of wear of the sealing means.

A further object of the present invention is to provide a sampling apparatus with a hydraulically actuated linkage mechanism for moving a hopper and attached cover means in an arcuate path over a cutter head and which positions the cover means on top of the cutter head in such a manner as to greatly reduce the amount of wear of the cover means.

Still a further object is to provide a sampler with actuating means located in a position which allows for easy access to the actuating means for repair purposes.

Figure 1:
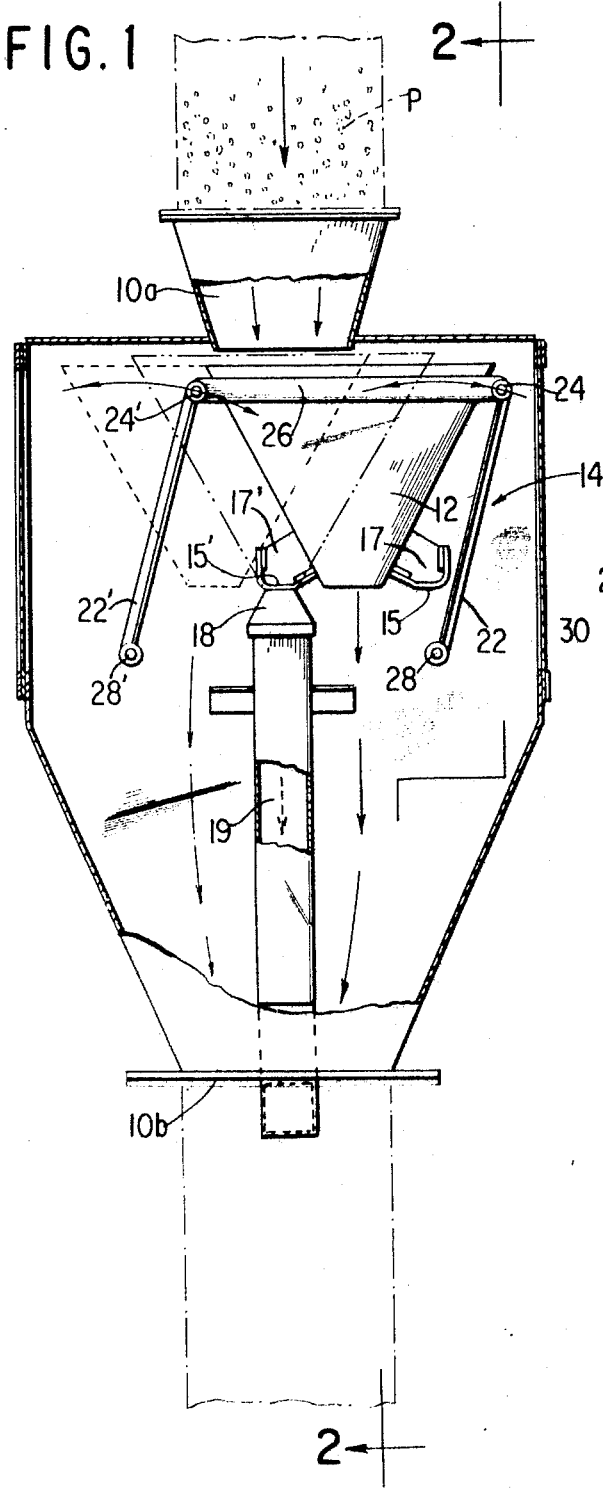
Figure 2:
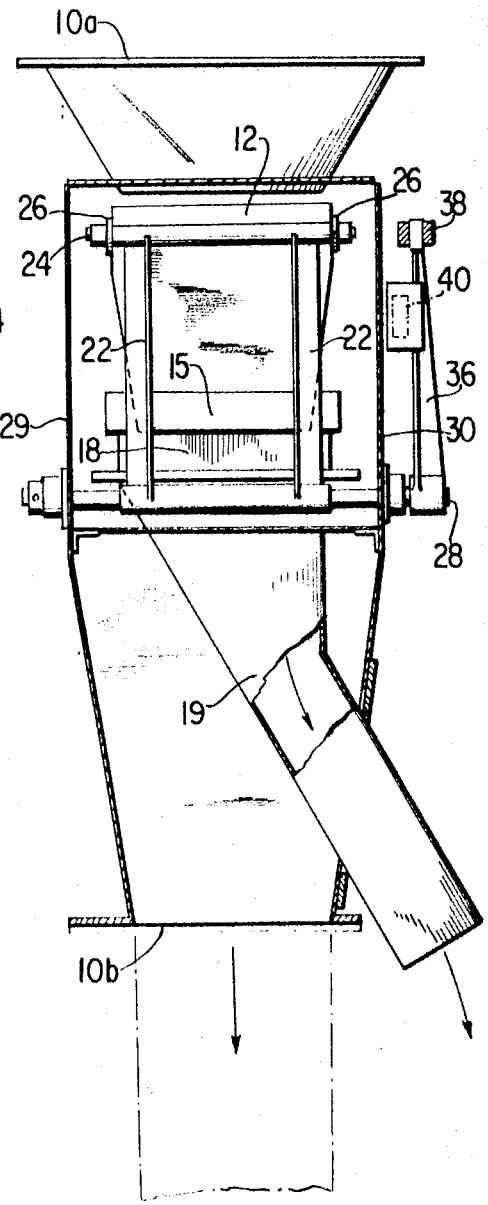

Other objects and advantages of the present invention will become apparent from the following detailed description when considered in conjunction with the accompanying drawings wherein:

FIG. 1 is a side view of the housing with parts broken away to show the sampling apparatus;
FIG. 2 is a view taken along line 2—2 of FIG. 1;
FIG. 3 is a rear view of the housing shown in FIG. 1 and illustrating the hydraulic actuating means for the linkage mechanism.

In the preferred embodiment shown in the drawings the downwardly moving stream of particulate material *p*, which, for example, could have been discharged from a conveyor (not shown) enters the upper opening 10a of housing 10 and passes through hopper 12 before normally being discharged from the lower opening 10b. The hopper is supported by a linkage mechanism 14 which is adapted to be pivoted in an arcuate path back and forth over the cutter head 18 between a first and a second nonsampling position whenever a sample is required. A cutter pipe on sample chute 19 is connected to the cutter head and extends to the outside of housing 10. The cutter head 18 and attached cutter pipe or sample chute 19 forms a sampling means having a continuous passageway formed therein which opens at the central portion of the housing and at a point outside the housing. The passageway opens upwardly on the inside of the housing at the cutter head section so that when the hopper is moved over the cutter head the downwardly moving stream of material is directed into the passageway and channeled through the passageway to a discharge point outside the housing.

Cutter covers or sealing means 15, 15' are attached in a conventional manner to the flanges of mounting brackets 17, 17' by, for example, rivets. The sealing means are made out of rubber or plastic for example, and are mounted so that the sealing faces of the sealing means are in substantially the same plane as the lower opening formed by the hopper. Cutter cover 15' seals cutter head 18 when the hopper is in the first nonsampling position shown in FIG. 1 and cover 15 seals the cutter head when the hopper is in the second nonsampling position shown by dashed-lines in FIG. 1. Both cutter covers are adapted to enter into sealing engagement with the head by moving in an arcuate downward path and are retracted out of contact from the head by moving in an upward arcuate path as will hereinafter be described.

The linkage mechanism 14 is comprised of two pair of similar arms 22, 22' rotatably connected to the shafts 24, 24', respectively. The shafts 24, 24' are secured between the ends of hopper support plates 26 connected to the front and back face of the hopper. The opposite ends of each pair of arms 22, 22' are attached to shafts 28, 28', respectively, which extend through and are rotatably mounted in the front and rear walls 29, 30, of the housing.

The linkage mechanism is actuated by hydraulic means 16 pivotally mounted about pin 34 on the outside of the housing. An actuating lever 36 is connected to the shaft 28' and is pivotally connected to the clevis 38 of the hydraulic means. Any conventional control means (not shown) will, when actuated, allow fluid under pressure to be supplied to the hydraulic means for extending or retracting the clevis which, in turn, pivots lever 36 and moves the hopper in an arcuate path over cutter head 18. Two limit switches 40, 40' mounted to the outside of the housing on either side of lever 36 serve to signal the control means when contacted by the lever in order to shut off the flow of fluid under pressure to the hydraulic means. Actuation of either limit switch also actuates a conventional control valve (not shown) so that when the control means is again actuated the flow of fluid under pressure is reversed in order to move the clevis in a reverse direction. This type of control system is well known in the art and forms no part of the present invention.

In operation, the movement of the lnikage mechanism causes the supported hopper to be carried in arcuate path over the cutter head. The particulate material p which is normally passed through the hopper and out the lower opening in the housing 10 will, during sampling, be directed into the passageway in the cutter head 18. The material received by the cutter head during sampling is channeled to the outside of the housing by means of the passageway in the cutter pipe 19. After the lower opening of the hopper passes over the cutter head, the cutter cover, which likewise has been traveling in an arcuate path, comes into contact with the cutter head in order to thereby prevent any dust or air suspended particles from entering the sampling chute when a sample is not being taken. When the control means is again actuated for taking another sample the linkage and associated hopper are moved in an arcuate path in the opposite direction.

It will be apparent that with the present invention it is possible to gently seat the cutter covers or sealing means on top of the cutter head by moving them in a slight arcuate path. Thus, use of the mechanism of the present invention eliminates much of the friction and wear which would be experienced by cutter covers if they were, for example, reciprocated in a straight line path back and forth across the cutter head. Furthermore, access to the hydraulic actuating mechanism for repair purposes is greatly facilitated by having it located on the outside of the housing.

Obviously many modifications and variations of the present invention are possible in light of the above teachings. It is therefore to be understood that the invention may be practiced otherwise than as specifically described.

What is claimed is:

1. A sampler for sampling a downwardly moving stream of material comprising:
   sampling means defining a passageway having a receiving end for receiving a portion of the stream of material and directing it to a discharge end of the passageway remote from the stream;
   hopper means adapted to guide the entire stream of material;
   a linkage mechanism supporting said hopper means for back and forth movement in an upwardly curving arcuate path over the receiving end of said sampling means;
   actuating means coupled to said linkage mechanism for moving said hopper means back and forth over the receiving end of said sampling means between a first and second nonsampling position, said hopper means adapted to direct the entire stream of downwardly moving material into the passageway of said sampling means as said hopper means moves over the receiving end of said sampling means; and
   seal means coupled to said hopper means which move down into contact with, and cover, the receiving end of the passageway of said sampling means as said hopper means moves through the arcuate path into either the first or second nonsampling positions.

2. A sampler as described in claim 1 wherein said seal means includes a first and a second resilient cover means mounted on opposite sides of said hopper means, said first resilient means adapted to be moved down into engagement with the receiving end of said sampling means when said hopper means is in the first nonsampling position and said second resilient means adapted to be moved down into engagement with the receiving end of said sampling means when said hopper means is in the second nonsampling position, said first and said second resilient means being movable with said hopper means in an arcuate path when engaging and disengaging said sampling means.

3. A sampler as described in claim 1 wherein said seal means comprises first and second cover means securely attached to mounting brackets mounted on either side of said hopper means and wherein the sealing faces of both said first and second cover means are in substantially the same plane as the lower opening formed in said hopper means.

4. A sampler as described in claim 1 in combination with a housing adapted to receive and discharge a downwardly moving stream of material, said hopper means and said sampling means being positioned within said housing, the passageway defined by said sampling means extending to the outside of said housing, said linkage mechanism comprising support means attached to said hopper means and support arms pivotally connected at one end to said support means, said support arms positioned on opposite sides of said hopper means, the other end of said arms connected to shafts rotatably mounted in said housing, said actuating means mounted on the outside of said housing and coupled to one of said shafts.

References Cited

UNITED STATES PATENTS

| 2,495,944 | 1/1950 | Pletta et al. | 73—423 |
| 3,252,328 | 5/1966 | Huntington | 73—423 |
| 3,279,260 | 10/1966 | Huntington | 73—423 |

FOREIGN PATENTS

39–5897   4/1964   Japan.

LOUIS R. PRINCE, Primary Examiner

HARRY C. POST III, Assistant Examiner